(12) United States Patent
Albrecht et al.

(10) Patent No.: US 8,478,647 B2
(45) Date of Patent: Jul. 2, 2013

(54) TRANSACTION PRODUCT WITH LENS

(75) Inventors: Jessica D. Albrecht, Woodbury, MN (US); Erin M. Borkowski, Andover, MN (US); Timothy P. Clegg, Manhattan Beach, CA (US); Anthony V. Roberts, Rolling Hills-Estates, CA (US); Primoz Samardzija, Marina del Ray, CA (US); Timothy D. Schumann, Arden Hills, MN (US)

(73) Assignee: Target Brands, Inc., Minneapolis, MN (US)

( * ) Notice: Subject to any disclaimer, the term of this patent is extended or adjusted under 35 U.S.C. 154(b) by 163 days.

(21) Appl. No.: 12/647,111

(22) Filed: Dec. 24, 2009

(65) Prior Publication Data

US 2011/0161187 A1    Jun. 30, 2011

(51) Int. Cl.
*G06Q 20/00* (2012.01)
*G06K 19/00* (2006.01)

(52) U.S. Cl.
USPC ............................................ 705/17; 235/379

(58) Field of Classification Search
USPC ......................................................... 705/17
See application file for complete search history.

(56) References Cited

U.S. PATENT DOCUMENTS

| | | | |
|---|---|---|---|
| 1,957,716 A | 5/1934 | Koster | |
| 5,412,199 A | 5/1995 | Finkelstein et al. | |
| 5,572,371 A | 11/1996 | Woolf | |
| 5,578,353 A | 11/1996 | Drew, III | |
| 5,608,203 A | 3/1997 | Finkelstein et al. | |
| 5,610,770 A | 3/1997 | Galiani | |
| 5,676,401 A | 10/1997 | Witkowski et al. | |
| 5,776,586 A | 7/1998 | Lipper | |
| 5,817,385 A | 10/1998 | Stanislav | |
| D440,998 S | 4/2001 | Andrews | |
| 6,231,952 B1 | 5/2001 | Lipper | |
| 6,390,372 B1 | 5/2002 | Waters | |
| 6,457,585 B1 | 10/2002 | Huffer et al. | |
| 6,699,569 B2 | 3/2004 | Lipper | |
| 6,814,234 B2 | 11/2004 | Lipper | |
| 7,004,398 B1 | 2/2006 | Francis et al. | |
| 7,036,740 B2 | 5/2006 | Waters | |
| D523,076 S | 6/2006 | Lauer et al. | |
| 7,055,740 B1 | 6/2006 | Schultz et al. | |
| 7,198,196 B2 | 4/2007 | Halbur et al. | |
| 7,252,225 B2 | 8/2007 | Schultz et al. | |
| 7,264,155 B2 | 9/2007 | Halbur et al. | |

(Continued)

OTHER PUBLICATIONS

GO-TAG Solution by FirstData, dated Dec. 24, 2009.*

(Continued)

*Primary Examiner* — Garcia Ade
(74) *Attorney, Agent, or Firm* — Griffiths & Seaton PLLC; JoAnn M. Seaton

(57) ABSTRACT

A transaction product includes a substantially planar panel defining an aperture, a lens extending across the aperture, one or more auxiliary items, a foldable sheet, and an account identifier. The foldable sheet supports each of the one or more auxiliary items and is folded and positioned relative to the substantially planar panel such that at least one of the one or more auxiliary items is readily viewable through the lens. The account identifier is coupled with the substantially planar panel and links the transaction product to an account or record configured to track a financial value available for use toward a purchase price of one or more of goods and services. Other products, combinations, and associated methods are also disclosed.

33 Claims, 12 Drawing Sheets

U.S. PATENT DOCUMENTS

| | | |
|---|---|---|
| 7,275,683 B2 | 10/2007 | Lazarowicz et al. |
| 7,316,357 B2 | 1/2008 | Lindahl et al. |
| 7,360,710 B2 | 4/2008 | Lindahl et al. |
| 7,409,788 B2 | 8/2008 | Lauer et al. |
| 7,445,157 B2 | 11/2008 | Clegg et al. |
| 7,520,425 B2 | 4/2009 | Clegg |
| 7,591,418 B2 | 9/2009 | Halbur et al. |
| 7,614,548 B2 | 11/2009 | Schultz et al. |
| 2002/0078613 A1 | 6/2002 | Roberts et al. |
| 2002/0143697 A1 | 10/2002 | Gotfried |
| 2003/0024841 A1 | 2/2003 | Murphy |
| 2003/0080016 A1 | 5/2003 | Lipper |
| 2003/0090898 A1 | 5/2003 | Goldstein et al. |
| 2003/0217489 A1 | 11/2003 | Witkowski |
| 2004/0108237 A1 | 6/2004 | McClintock |
| 2004/0156125 A1 | 8/2004 | Graham et al. |
| 2006/0186196 A1 | 8/2006 | Schultz et al. |
| 2006/0225318 A1 | 10/2006 | Wilcoxen |
| 2006/0226236 A1 | 10/2006 | Cullen et al. |
| 2007/0170263 A1* | 7/2007 | Waters .......................... 235/487 |
| 2007/0215694 A1 | 9/2007 | Clegg |
| 2007/0266605 A1 | 11/2007 | Halbur et al. |
| 2008/0109350 A1 | 5/2008 | Lazarowicz et al. |
| 2008/0140725 A1 | 6/2008 | Gunn-Beshears et al. |
| 2008/0217401 A1 | 9/2008 | Birkeland et al. |
| 2008/0223939 A1* | 9/2008 | Halbur et al. ................. 235/494 |
| 2008/0230402 A1 | 9/2008 | Macor |
| 2008/0245875 A1 | 10/2008 | Holt et al. |
| 2008/0290180 A1 | 11/2008 | Lauer et al. |
| 2008/0314777 A1 | 12/2008 | Foster et al. |
| 2009/0055253 A1 | 2/2009 | Halbur et al. |
| 2009/0055318 A1 | 2/2009 | Borkowski et al. |
| 2009/0112711 A1 | 4/2009 | Clegg et al. |
| 2009/0140042 A1 | 6/2009 | Clegg |
| 2009/0164432 A1 | 6/2009 | Wang et al. |
| 2009/0166430 A1 | 7/2009 | Smith et al. |
| 2009/0166433 A1 | 7/2009 | Halbur et al. |
| 2009/0166436 A1 | 7/2009 | Haugen et al. |
| 2009/0308920 A1* | 12/2009 | Holt et al. ..................... 235/379 |

OTHER PUBLICATIONS

"GO-Tag™ Solution," firstdata.com, 2008, 2 pages.

U.S. Appl. No. 12/262,324, filed Oct. 31, 2008, entitled, "Transaction Product With Camera," 47 pages.

U.S. Appl. No. 12/340,433, filed Dec. 19, 2008, entitled, "Transaction Product With Slide Viewer," 51 pages.

U.S. Appl. No. 12/488,313, filed Jun. 19, 2008, entitled, "Transaction Card Assembly With Transaction Card and Auxiliary Item," 39 pages.

U.S. Appl. No. 12/610,300, filed Oct. 31, 2009, entitled, "Transaction Product With Foldable Sheet," 42 pages.

* cited by examiner

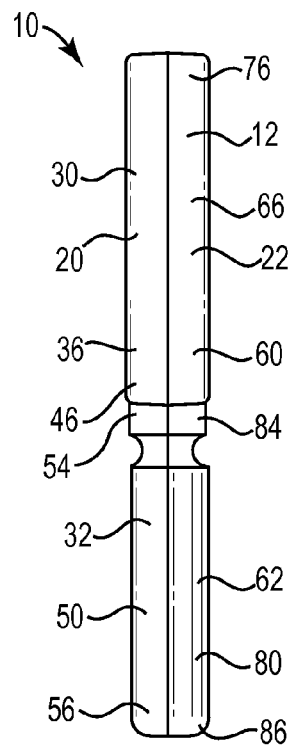
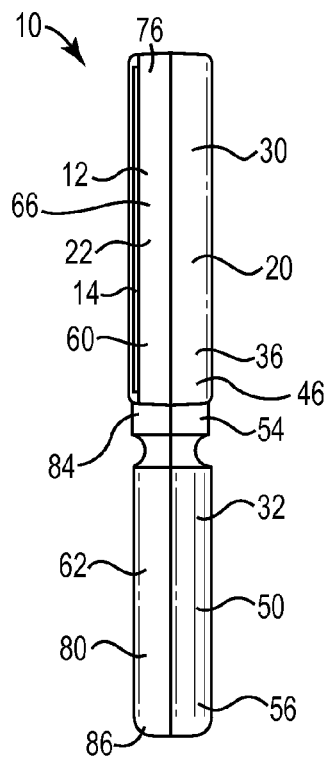
Fig. 5    Fig. 6
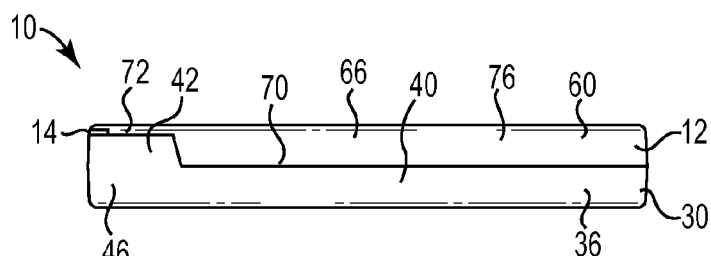
Fig. 7
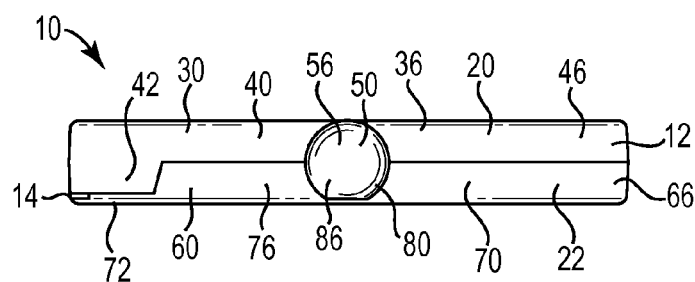
Fig. 8

TRANSACTION PRODUCT WITH LENS

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction products, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product including a substantially planar panel defining an aperture, a lens extending across the aperture, one or more auxiliary items, a foldable sheet, and an account identifier. The foldable sheet supports each of the one or more auxiliary items and is folded and positioned relative to the substantially planar panel such that at least one of the one or more auxiliary items is readily viewable through the lens. The account identifier is coupled with the substantially planar panel and links the transaction product to an account or record configured to track a financial value available for use toward a purchase price of one or more of goods and services. Stored-value product assemblies, methods of providing a transaction product, and other embodiments of stored-value or transaction products and associated combinations are also disclosed.

BRIEF DESCRIPTION OF THE DRAWINGS

Embodiments of the invention will be described with respect to the figures, in which like reference numerals denote like elements, and in which:

FIG. 5 is a left side view illustration of the transaction product of FIG. 1, according to one embodiment of the present invention.

FIG. 6 is a right side view illustration of the transaction product of FIG. 1, according to one embodiment of the present invention.

FIG. 7 is a top view illustration of the transaction product of FIG. 1, according to one embodiment of the present invention.

FIG. 8 is a bottom view illustration of the transaction product of FIG. 1, according to one embodiment of the present invention.

DETAILED DESCRIPTION

Figure 1:
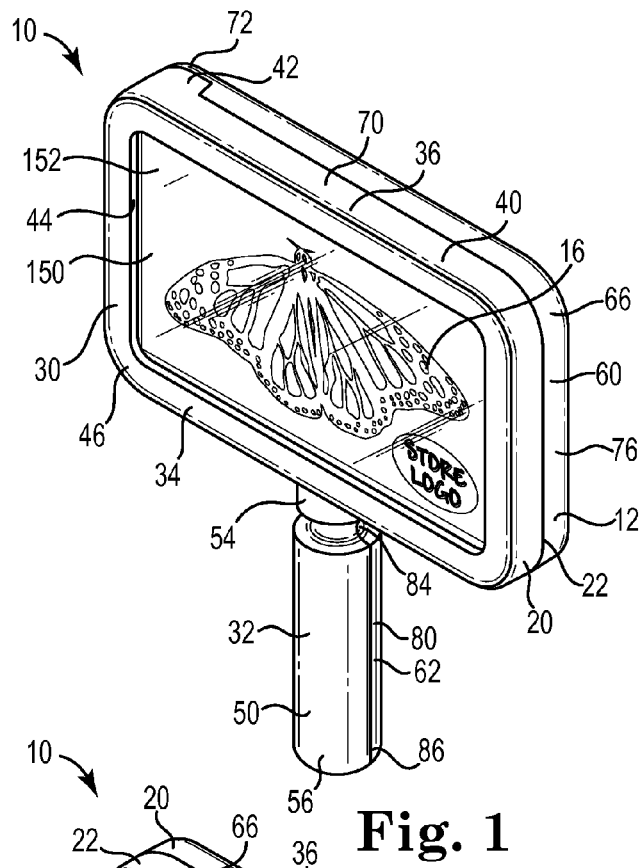
FIG. 1 is a front perspective view illustration of a transaction product, according to one embodiment of the present invention.

The following detailed description of the invention merely provides example embodiments and is not intended to limit the invention or the application and uses of the invention. Furthermore, there is no intention to be bound by any theory presented in the preceding background of the invention or the following detailed description of the invention.

A stored-value product or transaction product, such as a gift card or other financial transaction product, is adapted for making purchases of goods and/or services at, for example, a retail store or web site. According to one embodiment, an original consumer buys a transaction product to give a recipient who in turn is able to use it to pay for goods and/or services. A transaction product, according to embodiments of the present invention, provides functionality and/or means for entertaining and amusing a bearer of the transaction product in addition to the ability to pay for goods and/or services.

For example, a transaction product includes a transparent or translucent lens, e.g., a magnifying lens, a decoding lens, an otherwise distorting lens, etc. and one or more auxiliary, non-transactional articles (e.g., amusing or otherwise functional articles), which are viewable through the lens when the transaction product is in a first configuration. In one example, the transaction product is adapted to transition to a second configuration providing for easier access to the one or more auxiliary, non-transactional articles and/or to allow for relatively easy removal of a financial or other value-based portion of the transaction product, such as a transaction card from a remainder of the transaction product. In one embodiment, the transaction product additionally provides a housing for selectively storing the one or more auxiliary, non-transaction articles and/or other suitably sized and shaped articles. At least the lens, the auxiliary, non-transaction articles, and/or the storage capacity of the transaction product provide amusement and/or other functionality to the transaction product in addition to transactional functionality of the product.

Turning to the figures, FIGS. 1-10 illustrate one embodiment of a transaction product 10. Transaction product 10 includes an enclosure or housing 12, a transaction card 14 (e.g., a stored-value, gift, or calling card or article), and one or more auxiliary articles 16. In one embodiment, at least a portion of transaction product 10 (e.g., transaction card 14) is configured for use toward the purchase and/or use of goods and/or services while other portions of transaction product 10 additionally provide non-transactional functionality.

Housing 12 may be formed in any suitable manner as will be apparent to those of skill in the art upon reading this application, and, in one example, provides a space for storing one or more suitably sized and shaped articles and/or for selectively maintaining transaction card 14. In one embodiment, housing 12 includes a first or front casing 20 and a second or rear casing 22 coupled to one another to define the features of housing 12 described in detail herein.

In one example, housing 12 is configured to simulate a magnifying glass or similar object with a handle portion and a box portion. As such, in one embodiment, front casing 20 defines a first or box section 30 and a second or handle section 32 extending therefrom. More specifically, in one embodiment, box section 30 includes a substantially planar, and forward facing member or panel 34. Box section 30 additionally includes a sidewall 36 rearwardly extending from a perimeter edge of panel 34 to an opposite edge 38 (see the general reference in FIG. 9) facing away from panel 34. In one embodiment, sidewall 36 is substantially continuous around an outer perimeter of panel 34 and/or extends substantially perpendicularly from panel 34. For instance, sidewall 36 is substantially closed such that sidewall 36 extends around the entire outer perimeter of or at least a substantial entirety of the outer perimeter of panel 34. In one example, sidewall 36 defines a relatively shallow portion 40 and a relatively deep portion 42, where the relatively shallow portion 40 extends a smaller distance away from panel 34 than deep portion 42. Shallow portion 40 and deep portion 42 are be positioned relative to one another about perimeter of panel 34 in any suitable manner to provide additional structural stability and rigidity to housing 12 upon assembly of front casing 20 with rear casing 22. In one embodiment, panel 24 and sidewall 36 collectively define an exterior surface 46 (e.g., a front surface) and an opposite interior surface 48 (e.g., a rear surface) of front casing 20.

Figure 3:
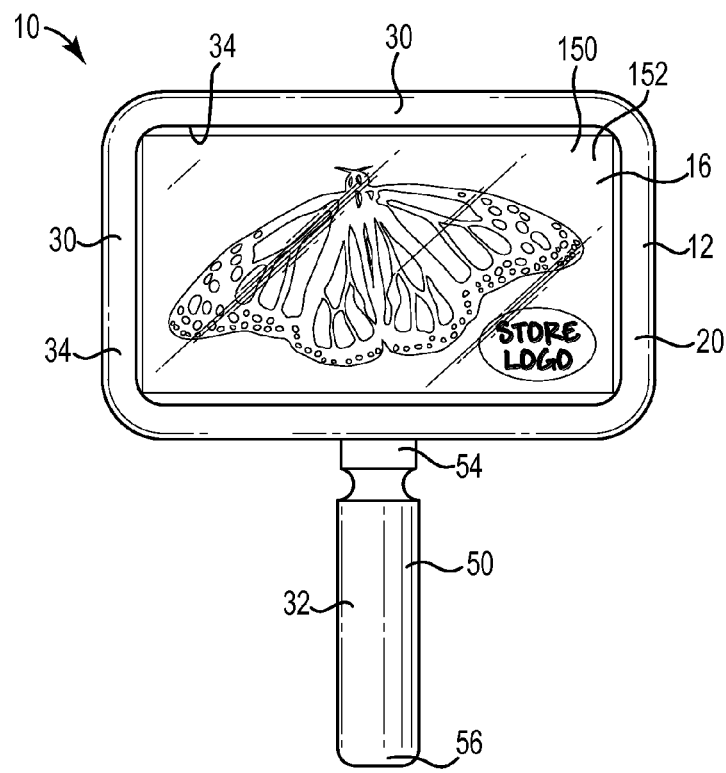
FIG. 3 is a front view illustration of the transaction product of FIG. 1, according to one embodiment of the present invention.

In one embodiment, panel 34 defines an opening or aperture 44 extending therethrough for example, such that panel 34 substantially forms a frame around aperture 44. In one embodiment, aperture 44 provides more than 30 percent, in one example, more than 50 percent, of a front view of box section 30 (e.g., as shown in FIG. 3) where panel 34 provides a majority of remaining portions of the front view of box section 30.

In one example, handle section 32 defines a first end 54 coupled with box section 30 and a free or opposite end 56. According to one embodiment of the invention, handle section 32 defines a forwardly facing, exterior surface 50 and an opposite interior edge 52 generally facing rearwardly with respect to the illustrated orientation of FIGS. 1-10. Handle section 32 may take any suitable overall shape, e.g., linear, round, triangular, etc. and is configured to provide a bearer of transaction product 10 with a relatively easy section to hold and interact with to manipulate housing 12 without obstructing the bearer's view through aperture 44.

In one example, rear casing 22 defines a first or box section 60 and a second or handle section 62 extending therefrom. More specifically, in one embodiment, box section 60 includes a substantially planar, and rearwardly facing member or panel 64. Box section 60 additionally includes a sidewall 66 forwardly extending from an outer perimeter of panel 64 to an opposite edge 68 (see the general reference in FIG. 9), which faces forwardly, away from panel 64. In one example, opposite edge 68 is sized and shaped similar to at least a portion of opposite edge 38 of box section 30 of front casing 20. In one embodiment, sidewall 66 is substantially continuous around a substantial portion of the outer perimeter of panel 64 and/or extends substantially perpendicularly relative to panel 34. For instance, sidewall 66 extends around substantially all of the perimeter of panel 64 other than an open side 73 of panel 64. In one embodiment, open side 73 is substantially linear and little or no portion of sidewall 66 extends forwardly from panel 64 along open side 73.

In one example, sidewall 66 defines a relatively deep portion 70 and a relatively shallow portion 72, where the relatively shallow portion 72 extends a smaller distance away from panel 64 than deep portion 70. Shallow portion 72, deep portion 70, and the transition between shallow portion 72 and deep portion 70 may be positioned relative to one another about perimeter of panel 34 in any suitable manner to provide additional structural stability and rigidity to housing 12 upon assembly of front casing 20 with rear casing 22. In one embodiment, shallow portion 72 has a depth (i.e., a dimension front to rear) similar to or just slightly larger than a thickness of transaction card 14 as will be further described below and is positioned adjacent either side of open side 73. In one embodiment, panel 64 and sidewall 66 collectively define an exterior surface 76 (e.g., a rear surface) and an opposite interior surface 78 (e.g., a front surface) of rear casing 22.

In one embodiment, an opening or aperture 74 is defined through panel 64, for example, such that panel 64 substantially forms a frame around aperture 74. In one embodiment, aperture 74 provides more than 60 percent, in one example, more than 75 percent, of a rear view of box section 60 where panel 64 provides a majority of remaining portions of the rear view of box section 60.

Handle section 62 of rear casing 22 defines a first end 84 coupled with box section 60 and a free or opposite end 86. According to one embodiment of the invention, handle section 62 defines an exterior surface 80 rearwardly facing and an opposite interior edge 82 generally facing forwardly with respect to the illustrated orientation of FIGS. 1-10. In one example, interior edge 82 is sized and shaped similar to interior edge 52 of handle section 32 of front casing 20. Handle section 62 may take any suitable shape, e.g., linear, round, triangular, etc. and is configured to provide a bearer of transaction product 10 with a relatively easy section to hold and interact with to manipulate housing 12 without obstructing the bearer's view through aperture 74.

In one embodiment, exterior surface 80 (as illustrated in the figures) is substantially rounded except for a substantially flat or planar area 90. Planar area 90 provides a portion of handle section 62 configured to be printed with any desired graphic, text, etc. and, in one example, includes brand indicia 88 (generally indicated with a dashed box for clarity) identifying a store configured to accept at least a portion of transaction product 10 as payment toward one or more of goods and services, a brand, a department, etc. Although pictured as being formed by exterior surface 80, in one embodiment, planar area 90 is additionally or alternatively formed by exterior surface 50 of front casing 20.

Although front casing 20 and rear casing 22 may collectively entirely form housing 12, in one embodiment, housing 12 additionally includes at least one interior frame to facilitate coupling components of transaction product 10 with housing 12 and/or to provide additional rigidity to housing 12. In one example, housing 12 includes a first or front interior frame 100 and a second or rear interior frame 102.

In one example, front interior frame 100 is sized and shaped to fit just inside a portion of housing 12, for instance, inside box section 30 of front casing 20. More specifically, in one embodiment, front interior frame 100 includes a substantially planar panel 110 or flange with an aperture 112 formed therethrough and a sidewall 114 extending around a substantial entirety of a perimeter of substantially planar panel 110. In one example, aperture 112 is shaped similarly to and sized smaller than an outer perimeter of substantially planar panel 110 and/or is substantially centered with respect to substantially planar panel 110. In one embodiment, aperture 112 is sized and shaped similarly to aperture 44 of box section 30 of front casing 20.

In one embodiment, sidewall 114 extends forwardly from and substantially perpendicularly with respect to a front surface 120 of substantially planar panel 110 to define a front edge 116. As such, a recess 122 is defined immediately adjacent front surface 120 of substantially planar panel 110 inside sidewall 114. In one example, sidewall 114 is positioned such that it also extends rearwardly from the substantially planar panel 110 such that a rear edge 118 is defined opposite front edge 116 and rearwardly offset from substantially planar panel 110. In another example, rear edge 118 is positioned to be coextensive with a rear surface (not shown) of substantially planar panel 130.

In one example, rear interior frame 102 is sized and shaped to fit just inside a portion of housing 12, for instance, inside box section 60 of rear casing 22. More specifically, in one embodiment, rear interior frame 102 includes a substantially planar panel 130 with an aperture 132 formed therethrough and a sidewall 134 extending around a substantial entirety of a perimeter of substantially planar panel 130 except for an open side 144 of rear interior frame 102. In one example, aperture 132 is shaped similarly to and sized smaller than an outer perimeter of substantially planar panel 130 and/or is substantially centered with respect to substantially planar panel 130. In one example, aperture 132 is sized and shaped similarly to aperture 74 in panel 64 of rear casing 22. In one embodiment, open side 144 is a linear length or side of substantially planar panel 130.

In one embodiment, sidewall 134 extends rearwardly from and substantially perpendicularly with respect to a rear surface 140 of substantially planar panel 130 to defines a rear edge 138. As such, a recess (not shown; but similar to recess 122 except where described herein) is defined immediately adjacent rear surface 140 of substantially planar panel 130 inside sidewall 134. In one example, sidewall 134 does not extend from one side or length of rear surface 140 such that an open side 144 of rear interior frame 102 is formed and provides access to the recess. Sidewall 134 defines a front edge 136 opposite rear edge 138. In one example, sidewall 134 is positioned such that it also extends forwardly from the substantially planar panel 130 such that front edge 136 is rearwardly offset from substantially planar panel 130. In another example, front edge 136 is positioned to be coextensive with a rear surface (not shown) of substantially planar panel 130.

In one embodiment, housing 12 includes a lens 150, which, for purposes of this application, includes any material having some degree of translucency or transparency such that one can view objects therethrough. In one example, lens 150 has distorting (e.g., magnifying, tinted, and/or faceted) characteristics that alter the appearance of items viewed therethrough. In the embodiment primarily described herein, lens 150 is a magnifying lens, for example, an acrylic fresnel magnification lens with about a two-inch focal length.

Lens 150 is positioned and configured to extend entirely across aperture 44 of front casing 20 of housing 12. In one example, upon assembly, lens 150 occupies at least about 30 percent, and, in one example, at least about 50 percent of a front facing surface area of box section 30. In one embodiment, lens 150 is substantially planar (e.g., other than the ridged portion and/or a slight variation in thickness of one side of a fresnel lens) and defines a front surface 152 and a rear surface 154 opposite front surface 152 to define a thickness of lens 150 therebetween. A perimeter edge 156 is defined between front surface 152 and rear surface 154. In one example, lens 150 is sized such that perimeter edge 156 is sized and shaped similarly to the outer perimeter of planar panel 110 such that lens 150 is configured to fit into recess 122, which is defined within the boundaries of sidewall 114. In one embodiment, perimeter edge 156 abuts sidewall 114 around a substantial entirety perimeter edge 156. The thickness of lens 150 is sized similarly to or slightly smaller than a depth of recess 122 defined between front surface 120 and front edge 116 of sidewall 114.

Transaction card 14 is any suitable portion of transaction product 10 configured to impart the financial or value-based functionality to transaction product 10. In one embodiment, transaction card 14 is configured to be readily separated from a remainder of transaction product 10 and to be separately used as payment toward a purchase price of one or more of goods and services. Transaction card 14 is formed of any suitable substrate such as a somewhat rigid yet flexible material in a substantially planar form. More specifically, in one embodiment, transaction card 14 is a substantially planar member formed of one or more layers of plastic (e.g. polycarbonate, polystyrene, polyvinyl chloride (PVC), acrylonitrile butadiene styrene (ABS), polyethylene terephthalate (PET), teslin, polyactide (PLA) or acrylic) or a composite. In one embodiment, transaction card 14 is cut from sheet-stock plastic material. In one embodiment, transaction card 14 is substantially planar and relatively thin to define a front surface 160 and a rear surface 162 opposite front surface 160 with a perimeter edge 164 being formed therebetween.

Referring to the rear view illustration of FIG. 3, in one example, rear surface 162 of transaction card 14, or any other suitable portion of transaction card 14, includes at least one account activation area or account identifier 166, such as a bar code, magnetic strip, a smart chip or other electronic device, a radio frequency identification (RFID) device or other suitable identifier readily machine readable by a point-of-sale terminal or other account access station or kiosk. Account identifier 166 indicates an account or record to which transaction card 14 is linked. The account or record of the monetary or other balance on transaction card 14 optionally is maintained on a database, other electronic or manual record-keeping system or, in the case of "smart" cards for example, on a chip or other electronic device(s) on transaction card 14 itself. Accordingly, by scanning account identifier 166, the account or record linked to transaction card 14 is identified and can subsequently be activated, have amounts debited therefrom, and/or have amounts added thereto.

In one embodiment, account identifier 166 includes a character string or code 168 (e.g., a number and/or letter string) configured to provide additional security to the user of transaction card 14 and/or configured to be read by a bearer of transaction card 14 to facilitate use of transaction card 14 for web site or other purchases outside of brick-and-mortar type retail establishments. With the above in mind, account identifier 166 is one example of means for linking transaction card 14 with an account or record, and scanning of account identifier 166 is one example of means for activating or loading value on transaction card 14. Transaction card 14 is one example of means for supporting account identifier 166.

Figure 2:
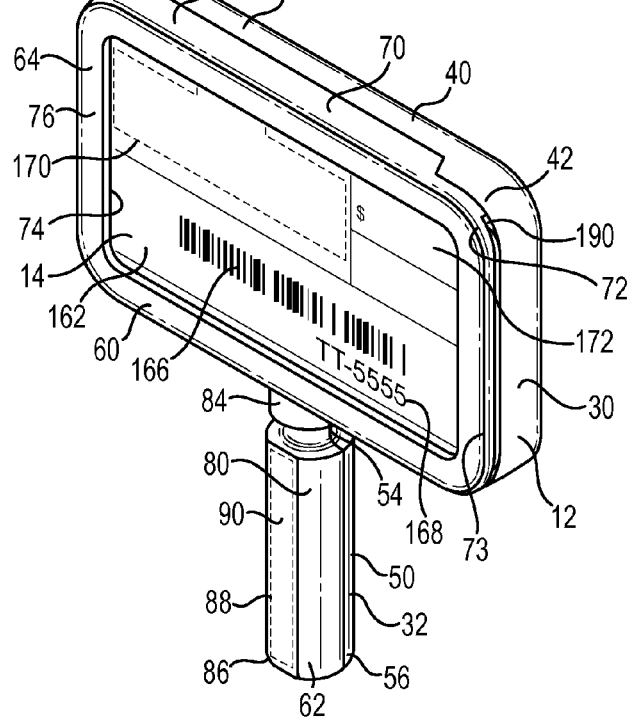
FIG. 2 is a rear perspective view illustration of the transaction product of FIG. 1, according to one embodiment of the invention
Figure 4:
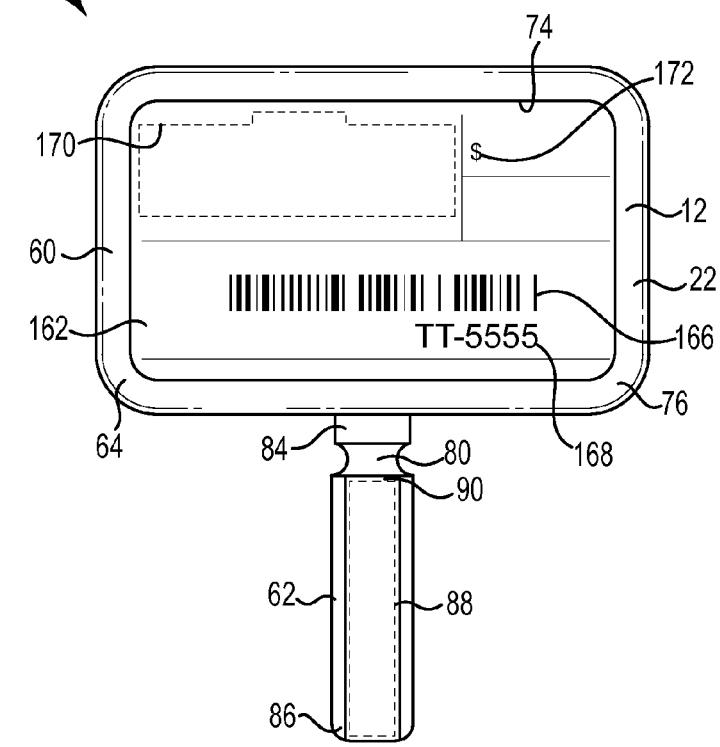
FIG. 4 is a rear view illustration of the transaction product of FIG. 1, according to one embodiment of the present invention.
Figure 9:
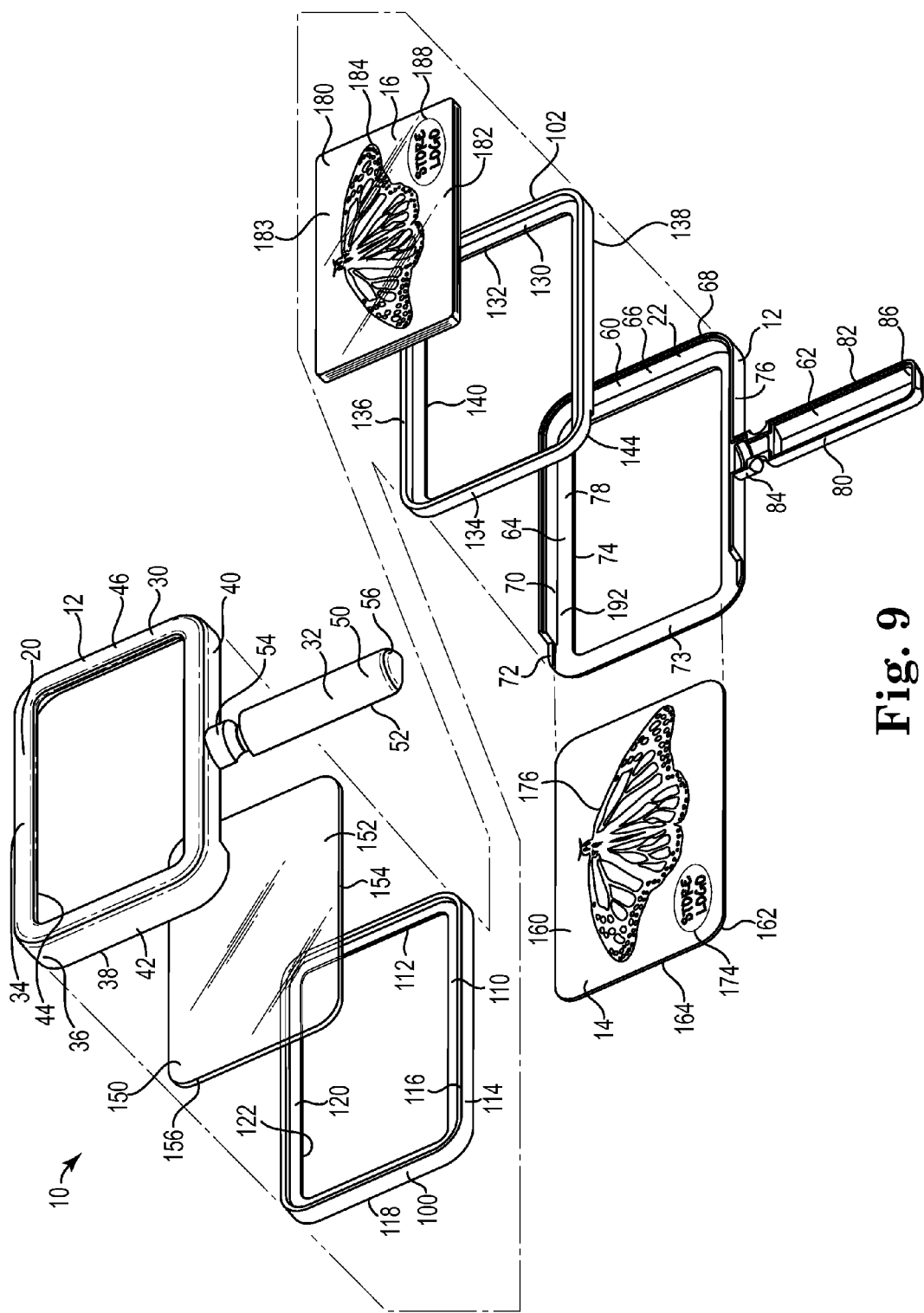
FIG. 9 is an exploded perspective view illustration of the transaction product of FIG. 1, according to one embodiment of the present invention.

In one embodiment, redemption indicia 170 are included on transaction card 14 such as on rear surface 162 of transaction card 14 as generally indicated by the dashed box in FIGS. 2 and 4. Redemption indicia 170 indicate that transaction card 14 is redeemable for the purchase of goods and/or services and that, upon use, a value of the purchased goods and/or services will be deducted from the account or record linked to transaction product 10. In one embodiment, redemption indicia 170 include phrases such as "<NAME OF STORE> GiftCard" and "This GiftCard is redeemable for merchandise or services at any of our stores or at our web site," and/or provides help or phone line information in the case of a lost, stolen, or damaged transaction card, etc.

In one embodiment, front surface 160 and/or rear surface 162 of transaction card 14 includes graphical indicia 176. Graphical indicia 176 include any suitable graphics such as pictures, images, text, drawings, or combinations thereof. In one embodiment, graphical indicia 176 serve to visually associate transaction card 14 with another portion of transaction product 10, for example, with the one or more auxiliary articles 16 as will be further described below.

In one example, transaction card 14, for example, front surface 160 of transaction card 14, includes a brand identifier 174. Brand identifier 174 includes one or more of a logo, text, trademark, etc. that associate transaction product 10 with at least one of a product, a brand, a store, etc. In one example, brand identifier 174 indicates a store or location configured to receive transaction card 14 as payment toward the purchase price of goods and/or services.

Housing 12 can be assembled with the steps performed in a variety of different orders as will be apparent to those of skill in the art. In one embodiment, assembly begins by coupling front interior frame 100 to rear interior frame 102. More specifically, in one example, rear edge 118 of front interior frame 100 is aligned and coupled with front edge 136 of rear interior frame. In one embodiment, rear edge 118 and front edge 136 are similarly sized and shaped such that they directly abut and extend substantially coextensive with one another. In one example, rear edge 118 and front edge 136 are coupled with one another in any suitable manner such as with adhesive, ultrasonic welding, etc.

Rear interior frame 102 is placed in rear casing 22. More specifically, in one embodiment, rear edge 138 of rear interior frame 102 is positioned to directly abut a portion of interior surface 78 defined by panel 64 of rear casing 22, and open side 144 of rear interior frame 102 is aligned with open side 73 of rear casing 22. In this manner, since, in one embodiment, the portion of exterior surface 76 defined by panel 64 is rearwardly offset from rear edge 138, a space or chamber 192 (FIG. 9) for receiving transaction card 14 is formed between panel 64 of rear casing 22 and rear surface 140 of substantially planar panel 130 of rear interior frame. By aligning open side 144 of rear interior frame 102 with open side 73 of rear casing 22, an elongated slot 190 is formed providing access to chamber 192 from a position external to housing 12.

Lens 150 is placed within recess 122 defined by front interior frame 100. More specifically, in one embodiment, rear surface 154 of lens 150 is positioned to directly abut and rest upon front surface 120 of front interior frame 100 such that perimeter edge 156 fits just inside closed sidewall 114. The thickness of lens 150, at least near perimeter edge 156, is similar to or less than a distance front edge 116 is spaced from front surface 120 of substantially planar panel 110 such that lens 150 does not extend beyond front edge 116 at least near perimeter edge 156 of lens 150.

In one example, next, front casing 20 is positioned over front interior frame 100 such that a portion of interior surface 48 defined by panel 34 of front casing 20 directly abuts front edge 116 of front interior frame 100 and opposite edge 38 of front casing 20 directly abuts opposite edge 68 of rear casing 22. In one embodiment, edges 38 and 68 of front casing 20 and rear casing 22, respectively, are secured to one another via adhesive, ultrasonic welding, and/or any other suitable method. Once front casing 20 and rear casing 22 are secured to one another, the other portions of housing 12 are held in place interposed between front casing 20 and rear casing 22. For example, lens 150 is held in place between front surface 120 of front interior frame 100 and interior surface 48 of box section 30. In one embodiment, front interior frame 100 and/or rear interior frame member 102 are coupled via adhesive, ultrasonic welding, or other method to the respective front casing 20 and rear casing 22. In one embodiment, front interior frame member 100 and/or rear interior frame member 102 are coupled with front casing 20 and rear casing 22 merely by virtue of their positioning between front casing 20 and rear casing 22. In a similar manner, lens 150 may be secured via adhesive, ultrasonic welding, etc. to front interior frame 100 or may simply be held in place due to its positioning between panel 24 of front casing 20 and front surface 120 of substantially planar panel 110 of front interior frame 100.

In one embodiment, the above-described placement of front casing 20 with respect to rear casing 22 also positions handle sections 32 and 62 to align with one another. More specifically, in one example, interior edge 52 of handle section 32 directly abuts and coextensively extends with interior edge 82 of handle section 62. Although housing 12 is primarily shown and described as including front casing 20 and rear casing 22 each integrally and homogenously forming box section 30 or 60 with the corresponding handle section 32 and 62, in one embodiment, the portion of housing 12 collectively defined by box sections 30 and 60 may be formed separately from a handle (e.g., a handle similar to that collectively defined by handle sections 32 and 62). In such an embodiment, the separately formed handle, if included, may be attached to the collective box section 30 and 60 via any suitable attachment method, adhesive, ultrasonic welding, screws, rivets, etc.

Figure 10:
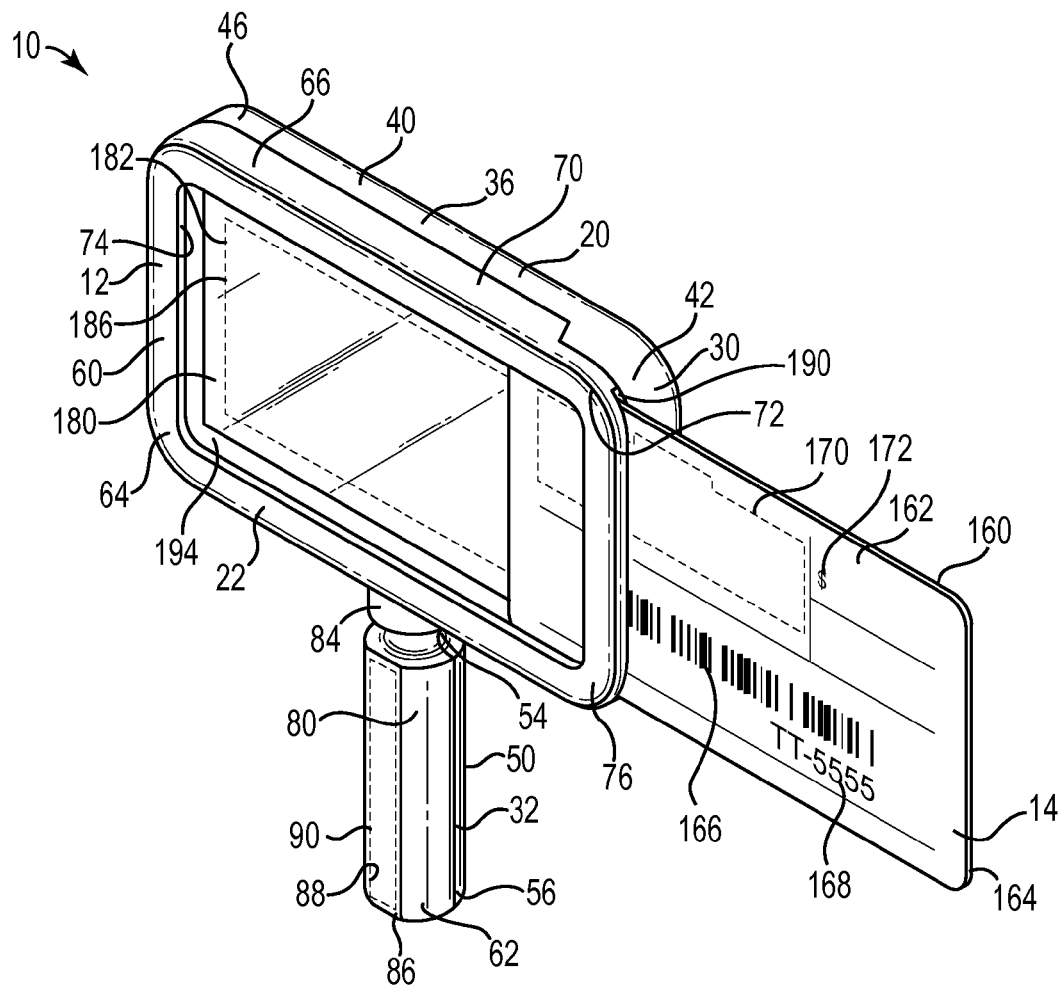
FIG. 10 is a rear perspective view illustration of the transaction product of FIG. 1 in a partially open configuration, according to one embodiment of the present invention.

Once housing 12 is assembled or during assembly of housing 12, transaction card 14 is slid into chamber 192 via slot 190 as generally illustrated in FIG. 10. Transaction card 14 is configured to be repeatedly slid into and slid out of chamber 192 as desired by a bearer of transaction product 10. Upon assembly of housing 12, a cavity 194 (e.g., a storage area or chamber) is defined on rear side of lens 150 between lens 150 and substantially planar panel 130 of rear interior frame 102. When transaction card 14 is slid into chamber 192, transaction card 14 entirely extends across aperture 74 of rear casing 22 such that cavity 194 is closed (i.e., cannot be directly accessed from a position external to housing 12). When transaction card 14 is slid out of chamber 192, cavity 194 is opened (i.e., directly accessible from the position external to housing 12).

In one embodiment, the one or more auxiliary articles 16 are placed in cavity 194. As such, the one or more auxiliary articles 16 collectively are sized and shaped to fit within cavity 194. In one embodiment, auxiliary articles 16 are provided on a folded supporting sheet or paper 183 (generally indicated through wrapper 180 in FIG. 9) in the form of temporary tattoos 184 or other items supported thereon. In one embodiment, in addition or as an alternative to the temporary tattoos 184, folded supporting paper 183 may include coded text, etc. only discernable through lens 150, stickers, or other suitable articles. In one embodiment, when paper 183 is folded into a first position, paper 183 defines at least two dimension smaller than two corresponding outer dimensions of either transaction card 14 or panel 34, and when paper 183 is unfolded, paper 183 has at least one dimension that is larger than a corresponding outer dimension of either transaction card 14 or panel 34 (e.g., similar to the unfolded sheet 430 in FIG. 16). In one example, a package or wrapper 180, such as a transparent or otherwise translucent wrapper, is formed around and encloses the one or more auxiliary articles 16 to collectively define a packaged item 182.

In one embodiment, packaged item 182 includes directional indicia 186 and/or brand indicia 188 similar to brand indicia 88 described above. For example, where the one or more auxiliary articles 16 include temporary tattoos 184, directional indicia 186 provide instructions regarding how to apply and remove the temporary tattoos, etc. In one example, directional indicia 186 are provided on one of a rear surface of paper 183 or a rear surface of wrapper 180. While primarily illustrated and described as being temporary tattoos 184 upon reading this application, it should be understood that other items such as stickers or other items with appeal to children and/or adults may additionally or alternatively be used as part of the one or more auxiliary articles 16. In one embodiment, at least one temporary tattoo 184 (or other item) is viewable through lens 150 when the one or more auxiliary articles 16 are placed in cavity 194. In one example, the at least one temporary tattoo 184 and brand indicia 88 or other items viewable through lens 150 are visually similar to graphical indicia 176 on front surface 160 of transaction card 14.

Figure 11:
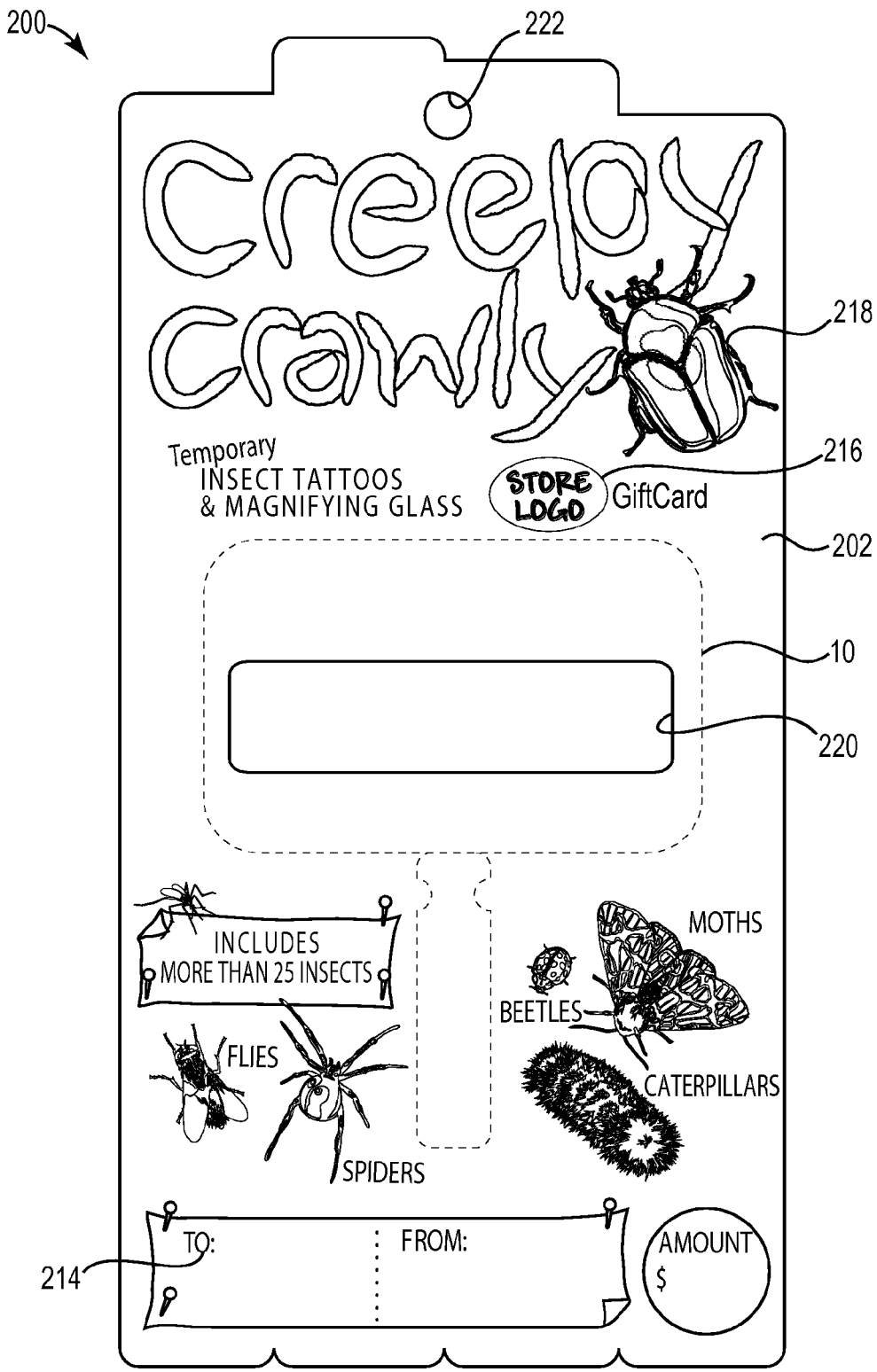
FIG. 11 is a front view illustration of a backer for supporting the transaction product of FIG. 1, according to one embodiment of the present invention.
Figure 12:
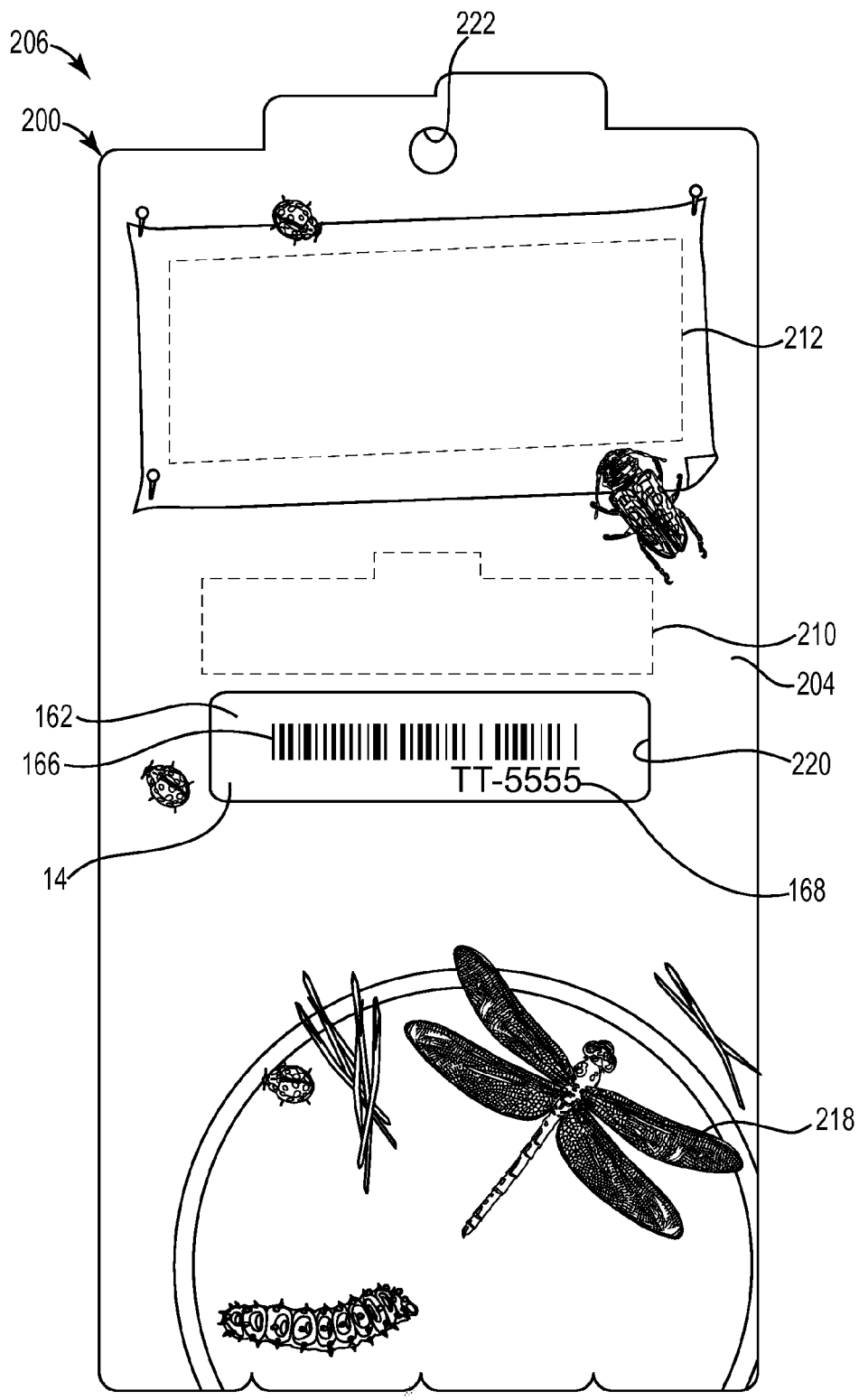
FIG. 12 is a rear view illustration of a transaction product assembly including the backer of FIG. 11 and the transaction product of FIG. 1, according to one embodiment of the present invention.

FIGS. 11 and 12 illustrate a carrier or backer 200 supporting transaction product 10 (FIGS. 1-10). Backer 200 comprises a single layer or multiple layers of paper or plastic material, for example, generally in the form of a relatively stiff card. Use of other materials to form backer 200 is also contemplated. Backer 200 defines a first or front surface 202 (FIG. 11) and a second or rear surface 204 (FIG. 12). Transaction product 10, which is generally represented in broken lines in FIG. 11 for illustrative purposes (e.g., to allow for full viewing of front surface 202), is readily releasably attached to backer 200, for example, by adhesive, blister packaging, overlying skinning material, clam shell packaging or the like, such that transaction product 10 and backer 200 collectively define a transaction product assembly 206.

In one embodiment, backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 202 and 204. In one example, the indicia include one or more of redemption indicia 210, instructional indicia 212, message field indicia 214, brand indicia 216, graphical or decorative indicia 218, etc.

Redemption indicia 210, which are generally indicated with a dashed box in FIG. 12, indicate that transaction product 10, or at least transaction card 14, is redeemable as payment toward a purchase price for goods and/or services and that upon use, a value of the purchased goods and/or services will be deducted from the account or record linked to transaction product 10. In one embodiment, redemption indicia 210 include phrases such as "<NAME OF STORE> GiftCard" and "This GiftCard is redeemable for merchandise or services at any of our stores or at our website," and/or provides help or phone line information in case of a lost, stolen or damaged transaction card 14, etc.

Instructional indicia 212 include any indications generally referring to how transaction product 10 can be used for entertainment or functional purposes other than value redemption. For example, instructional indicia 212 indicate to the bearer how to access the one or more auxiliary articles 16 by sliding transaction card 14 out of housing 12 and/or how to interact with the one or more auxiliary articles 16 (e.g., how to apply and/or remove temporary tattoos 184). Other instructional indicia 212 on transaction product 10 and/or backer 200 are also contemplated, and instructional indicia 212 may also promote what is included with transaction product 10 (e.g., "temporary insect tattoos & magnifying glass") in a manner encouraging potential consumers to purchase or activate, and/or load transaction product 10.

Message field indicia 214, for example, including "to," "from" and "amount" fields, are configured to be written to by the bearer of transaction product assembly 206 prior to presenting transaction product assembly 206 to a recipient. As such, message field indicia 214 facilitate the consumer in preparing transaction product assembly 306 for gifting to a recipient. Brand indicia 216 identify a store, brand, department, etc. and/or services associated with transaction product 10.

Any suitable decorative indicia 218 may also be included on backer 200. In one embodiment, decorative indicia 218 are similar to or otherwise coordinate with the one or more auxiliary articles 16 and/or functionality of housing 12, more particularly, lens 150. For example, decorative indicia 218 and temporary tattoos 184 may all be insect related or provided in another motif generally corresponding to the magnifying functionality of lens 150 and corresponding shape, etc. of housing 12. Any of indicia 210, 212, 214, 216, 218 or other indicia optionally may appear anywhere on backer 200 or transaction product 10. Additional information besides that specifically described and illustrated herein may also be included.

In one embodiment, backer 200 defines a window or opening 220 for displaying account identifier 166 of transaction product 10 as illustrated in FIG. 12. As previously described, account identifier 166 is adapted for accessing an account or record associated with transaction product 10 for activating, loading or debiting value from the account or record. Accordingly, in one embodiment, opening 220 allows access to account identifier 166 to activate and/or load transaction product 10 without removing transaction product 10 from backer 200.

In one embodiment, backer 200 defines a hanging aperture 224 configured to receive a support arm or hook, such that transaction product assembly 206 can be hung from a rail or rack within the retail setting or elsewhere to facilitate display of transaction product assembly 306 for retail sale, etc. In one embodiment, other backer types such as a foldable backer may be used as an alternative to or in addition to backer 200.

Figure 13:
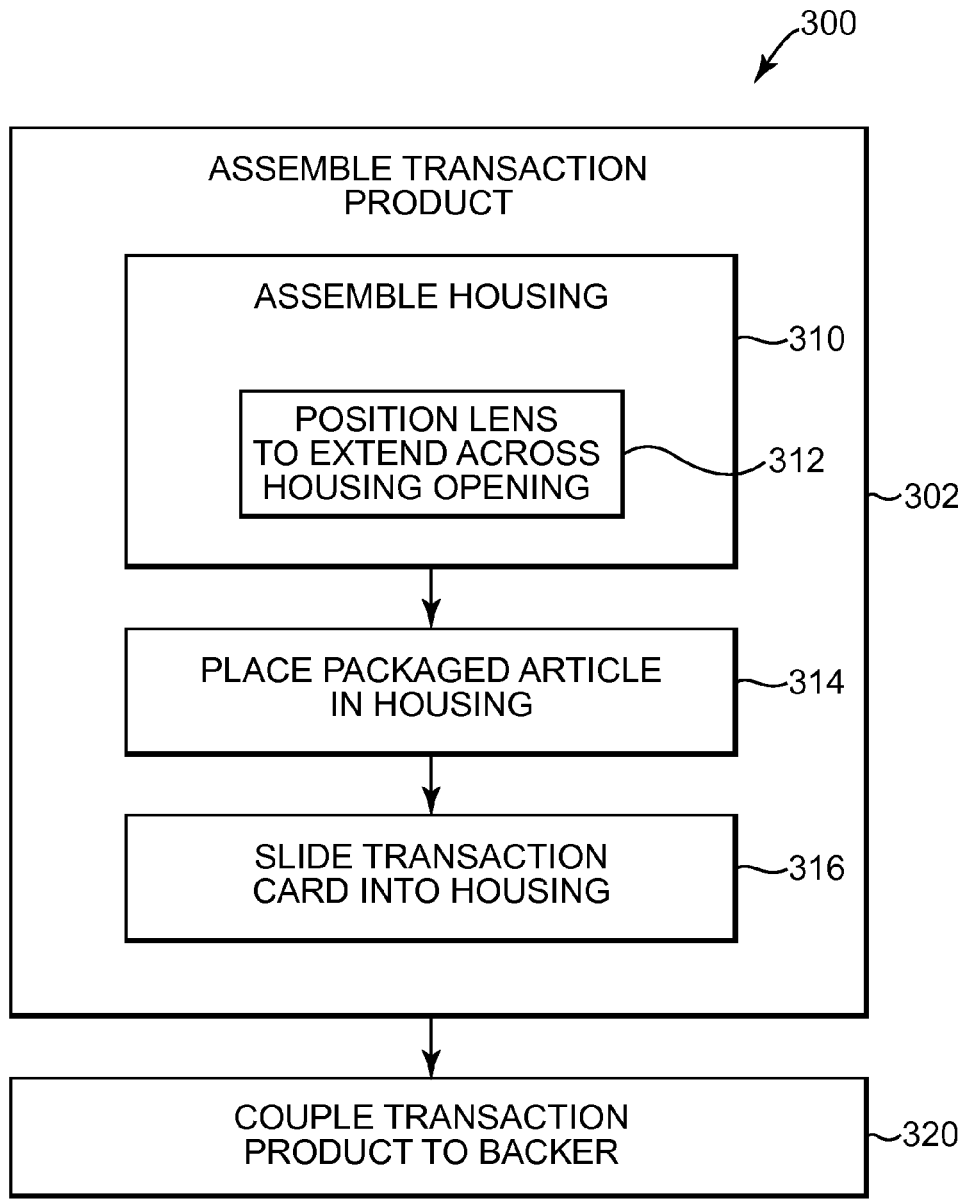
FIG. 13 is a flow chart illustrating a method of assembling a transaction product assembly, according to one embodiment of the present invention.

FIG. 13 is a flow chart illustrating one embodiment of a method 300 of assembling transaction product assembly 206. At 302, transaction product 10 is assembled, and, at 320, the assembled transaction product 10 is coupled with backer 200. At 310, assembly 302 of transaction product 10 begins by assembling housing 12. For example, as described above, in one embodiment, front interior frame 100 is coupled with rear interior frame 102, and lens 150 is placed in recess 122 of front interior frame 100. Front casing 20 is coupled with rear casing 22 interposing front lens 150, front interior frame 100, and rear interior frame 102 therebetween such that lens 150 extends across a entirety of aperture 44 defined by front casing 20. When housing 12 is assembled, chamber 192 for receiving transaction card 14 via slot 190 is formed and cavity 194 is defined. In one embodiment, cavity 194, any contents therein, and/or any items on the opposing side of cavity 194 are viewable through lens 150 from a vantage point external to housing 12.

At 314, packaged article 182 or other items are placed in cavity 194. In one embodiment, packaged article 182 including, for example, temporary tattoos 184 are placed in cavity 194 such that at least one of temporary tattoos 184 is viewable through lens 150 and/or wrapper 180. Once packaged article 182 is positioned, then, at 316, transaction card 14 is slid through slot 190 and into chamber 192 to close chamber 192 such that housing 12 selectively encloses packaged article 182 therein.

At 320, backer 200 is coupled with transaction product 10. For example, transaction product 10 is placed on front surface 202 of backer 200 such that account identifier 166 of transaction card 14 is viewable through window 220 in backer 200. In one embodiment, once transaction product 10 is positioned as desired, a transparent or at least translucent skinning material (not shown) is applied over front surface 202 of backer 200 and transaction product 10 using heat, adhesive, etc. to secure the skinning material to backer 200 and/or transaction product 10 such that transaction product 10 is held in place relative to backer 200. Other suitable methods of coupling backer 200 with transaction product 10 may additionally or alternatively be used such as adhesive, other coupling members, blister packs, etc. as will be apparent to those of skill in the art upon reading the present application.

Figure 14:
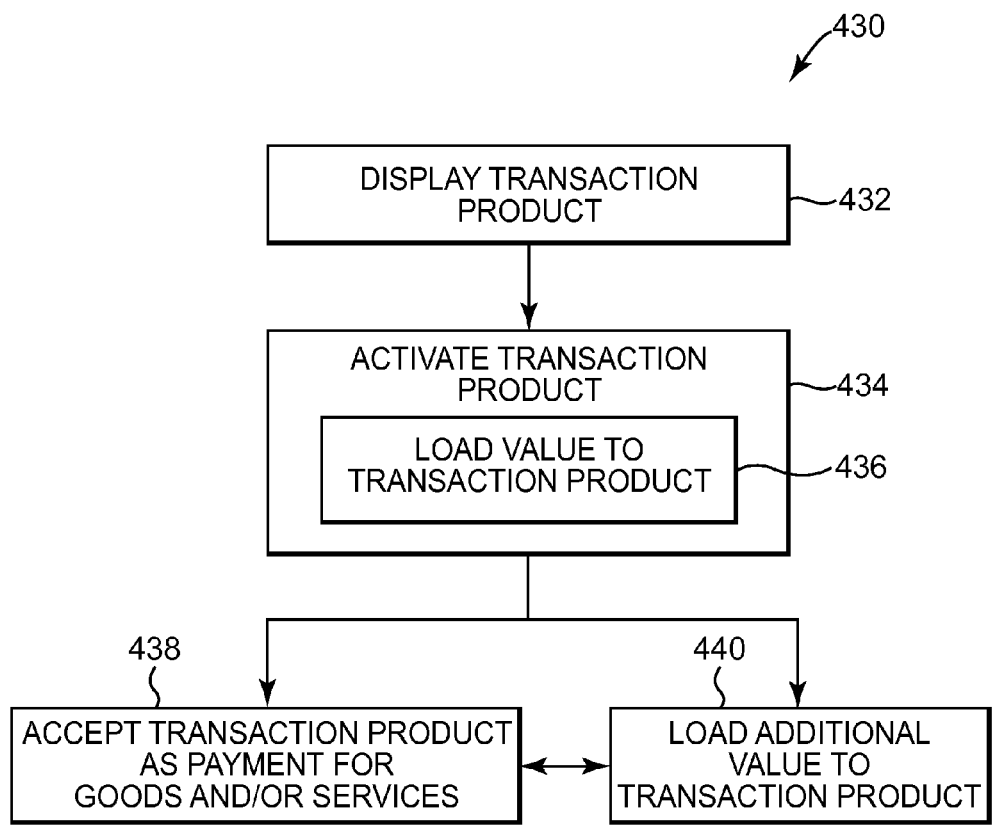
FIG. 14 is a flow chart illustrating a method of encouraging purchase and facilitating use of a transaction product assembly, according to one embodiment of the present invention.

FIG. 14 is a flow chart illustrating one embodiment of a method 430 of encouraging purchase and facilitating use of transaction product 10 by consumers and/or recipients. At 432, transaction product 10 is placed on or hung from a rack, shelf or other similar device to display transaction product 10 for sale to potential consumers. For example, additionally referring to FIGS. 1, 10, and 11, backer 200 may be hung from a display rack using aperture 132 such that transaction product 10 is readily visible to potential consumers. In one embodiment, a depiction of transaction product 10 is placed on a website for viewing by potential consumers.

At 434, a consumer who has decided to purchase transaction product 10 presents transaction product 10 on backer 200 to a retail store employee, retail store kiosk, remote terminal or other person or device to scan account identifier 166 using a machine, such as a kiosk or point-of-sale terminal, to access an account or record linked to account identifier 166. In particular, account identifier 166 is scanned or otherwise accessed, for example through opening 220 of backer 200 to activate transaction product 10. Upon accessing the account or record, then, at 436, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 166) prior to activation and display, such predetermined value is not initially available for use toward the purchase or use of goods and/or services. In such an embodiment, at 434, transaction product 10 is activated to permit subsequent access to the predetermined value (e.g., subsequent loading on and debiting from the account or record) and no additional value is added during activation such that operation 436 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 432, then, at 434, transaction product 10 may be activated in any suitable method and may not require the physical scanning of account identifier 166 to be activated or to otherwise access the associated account or record such as at 436.

In one example, at 438, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 166) is applied toward the purchase price of the goods and/or services. At 440, additional value is optionally loaded on transaction product 10 at a point-of-sale terminal, kiosk or other area of the retail store, retail website, or other related setting. Upon accepting transaction product 10 as payment at 438, the retail store or related setting can subsequently perform either operation 438 again or operation 440 as requested by a current bearer of transaction product 10. Similarly, upon loading additional value on transaction product 10 at 440, the retail store or related setting can subsequently perform either operation 440 again or operation 438. In one example, the ability to accept transaction product 10 as payment for goods and/or services is limited by whether the account or record associated with transaction product 10 has any value stored or recorded therein at the time of attempted redemption.

Figure 15:
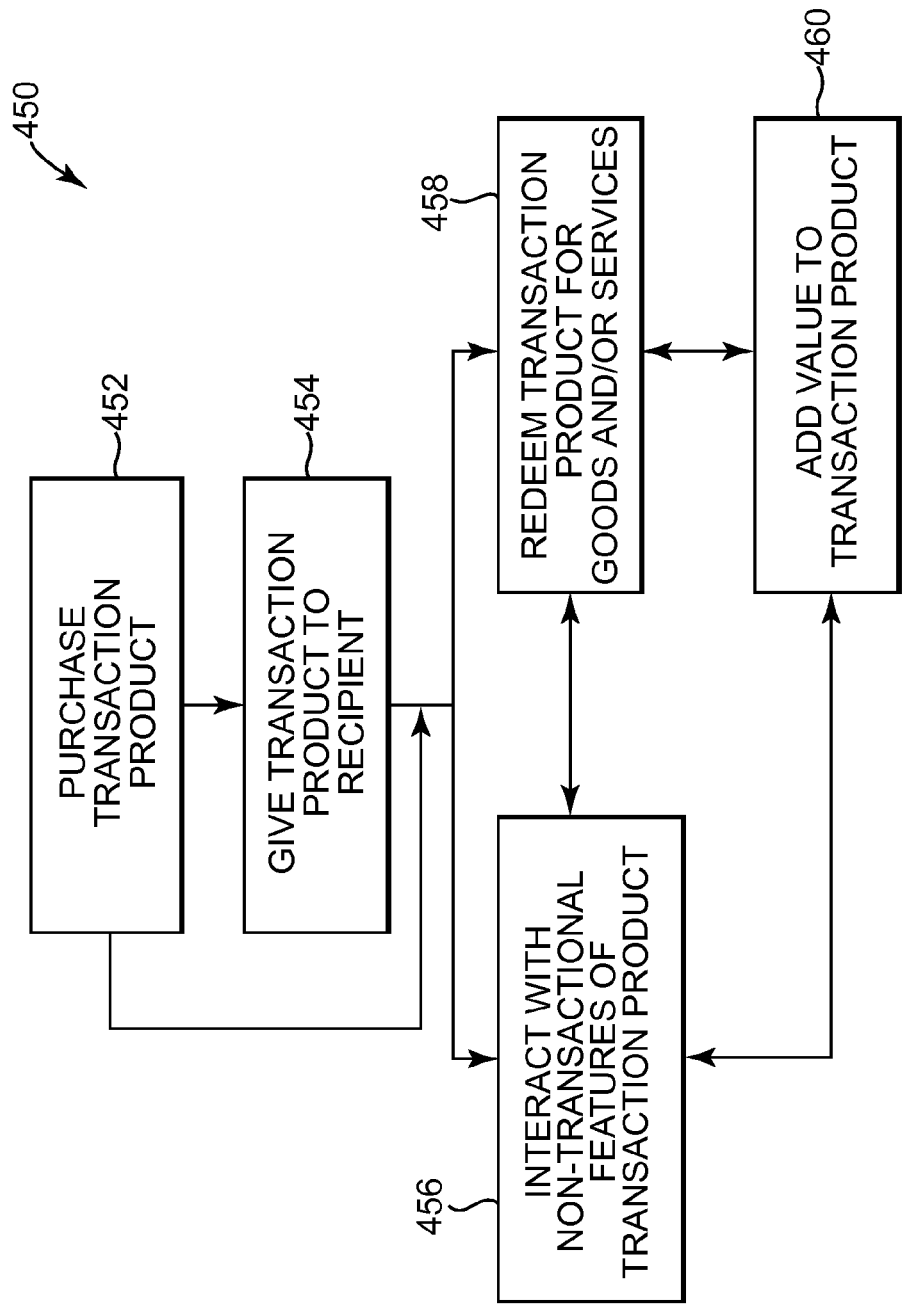
FIG. 15 is a flow chart illustrating a method of using a transaction product assembly, according to one embodiment of the present invention.

FIG. 15 is a flow chart illustrating one embodiment of a method 450 of using transaction product 10 (e.g., FIGS. 1-10). At 452, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206 (FIG. 12) along with backer 200. Upon purchasing transaction product 10, a retail store employee, a retail store kiosk or other person or device scans account identifier 166 (FIGS. 2, 4, and 12) through opening 220 of backer 200 or otherwise reads or accesses account identifier 166. Upon accessing account identifier 166, the account or record linked to account identifier 166 is accessed and activated to load value onto transaction product 10 (i.e., load value to the account or record associated with transaction product 10). In one embodiment, such as where transaction product 10 is purchased at 452 via a website, actual scanning or other mechanical detection of account identifier 166 may be eliminated and/or manual input of code 168 may be added.

At 454, the consumer optionally gives transaction product 10 to a recipient, such as a graduate, relative, friend, expectant parents, one having a recent or impending birthday, a couple having a recent or impending anniversary, etc. In one embodiment, a plurality of transaction product assemblies 206 are purchased and given to party goers, such as at a birthday party, etc. as party favors or gifts. As an alternative, the consumer can keep transaction product 10 for his or her own use thereby eliminating operation 454.

At 456, the consumer, recipient or other current bearer of transaction product 10 interacts with transaction product 10. In one embodiment, playing or otherwise interacting with transaction product 10 at 256 includes removing transaction product 10 from backer 200, removing transaction card 14 from housing 12, and removing packaged articles 182 from cavity 194 in housing 12. Once so manipulated, housing 12 or, more specifically, lens 150 can be used to view other items and objects such as portions of packaged article 182 and/or any other desired object as magnified or otherwise distorted through lens 150 in a manner that may entertain and/or educate the bearer. In addition packaged article 182 can be opened, wrapper 180 removed and used for amusing or other purposes. In one example, once wrapper 180 is removed, temporary tattoos 184 can be applied to the bearer or other individual according to directional indicia 186 and/or instructional indicia 212. Since transaction card 14 can be selectively and repeatedly inserted into and removed from housing 12, if a bearer so desires, interacting with the non-transactional features of transaction product 10 may include storing other items that differ from original packaged article 182 included in cavity 194 therein. Other non-transactional interactions with transaction product 10 will be apparent to those of skill in the art upon reading the present application.

At 458, the consumer or recipient redeems transaction product 10 or at least transaction card 14 for goods and/or services from the retail store or website. At 460, the consumer or recipient of transaction product 10 optionally adds value to transaction product 10, more particularly, to the account or record associated with account identifier 166 on transaction card 14, at the retail store or over the Internet (i.e., via the web site). Upon playing/interacting with transaction product 10 at 456, redeeming transaction product 10 at 458, or adding value to transaction product 10 at 460, the consumer or recipient of transaction product 10 subsequently can perform either of operations 456, 458, or 460 as desired. In one embodiment, the ability of the consumer or recipient to repeat redeeming transaction product 10 at 458 is limited by whether the account or record linked with transaction product 10 has any remaining value stored or recorded therein at the time of attempted redemption.

Although primarily described above as occurring at a single retail store or website, in one embodiment, purchasing transaction product 10 at 452, redeeming transaction product 10 at 458, and adding value to transaction product 10 at 460, can each be performed at any one of a number of stores adapted to accept transaction product 10 or over the Internet. In one example, a number of stores are each part of a chain or are similarly branded stores. In one example, a number of stores include at least one website and/or at least one conventional brick and mortar store.

Figure 16:
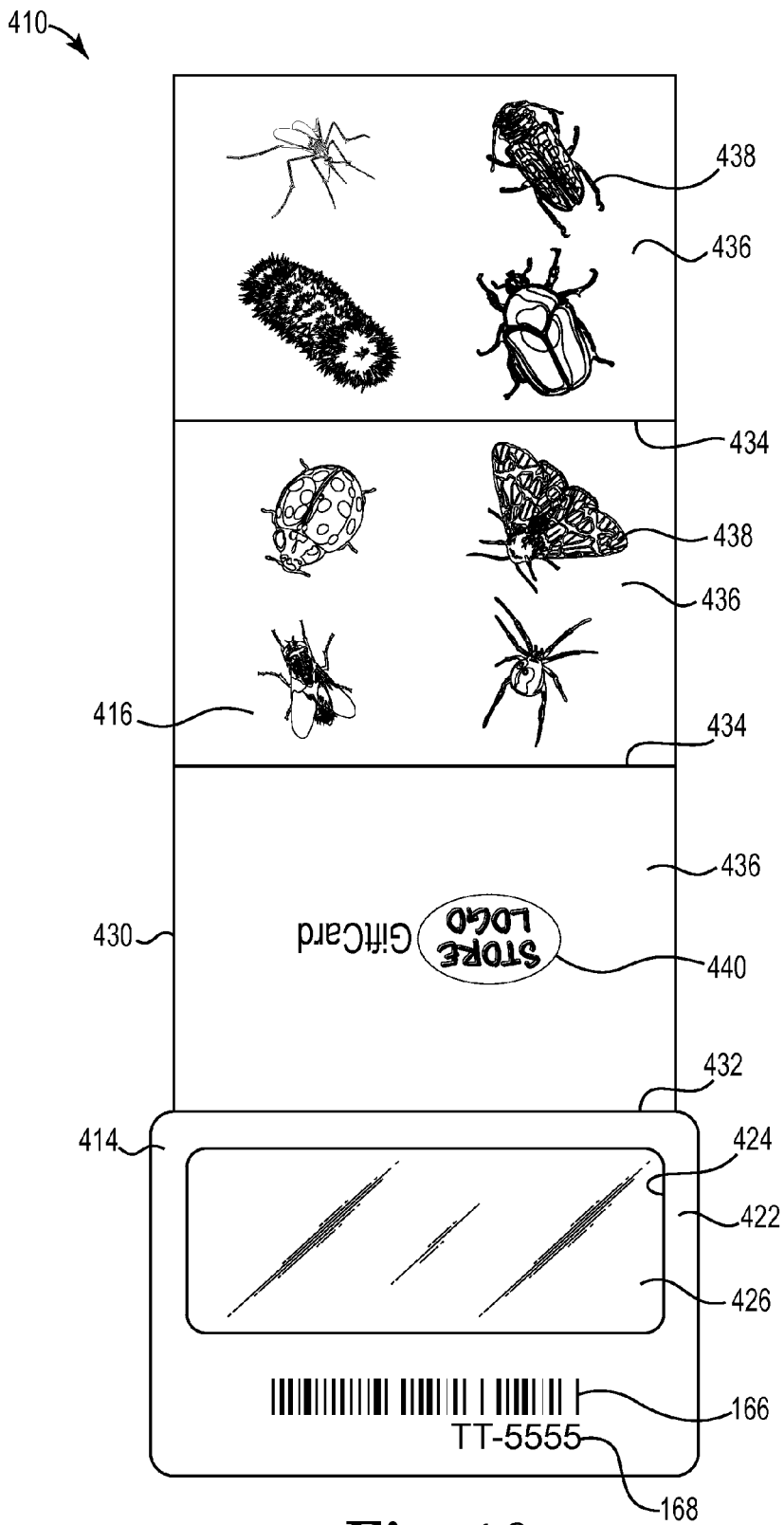
FIG. 16 is a rear view of a transaction product in an expanded configuration, according to one embodiment of the present invention.
Figure 17:
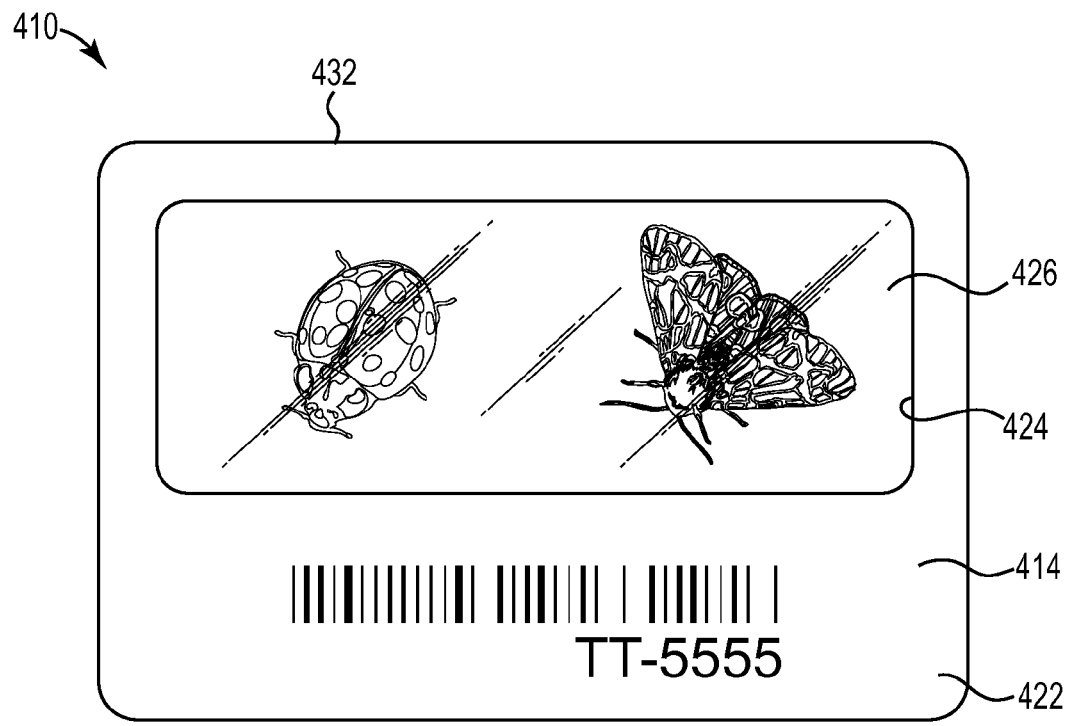
FIG. 17 is a rear view of the transaction product of FIG. 16 in a folded configuration, according to one embodiment of the present invention.
Figure 18:
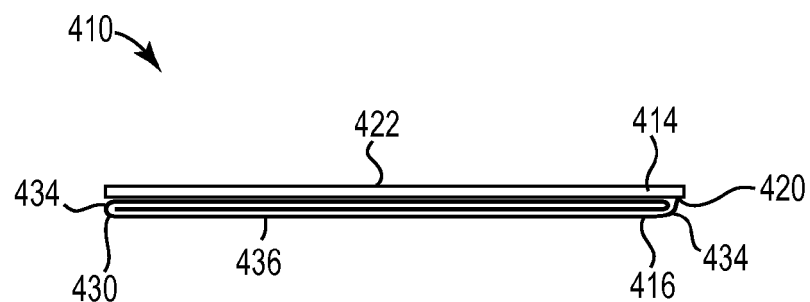
FIG. 18 is a right side view illustration of the transaction product of FIG. 17, according to one embodiment of the present invention.

FIGS. 16-18 illustrate one embodiment of a transaction product 410 including a transaction card 414 and one or more auxiliary articles 416. More specifically, transaction card 414 is similar to transaction card 14 described above and includes a front surface 420 (generally indicated in FIG. 18) and a rear surface 422. However, in one example, transaction card 414 includes an aperture 424 and a lens 426 extending across aperture 424 and separate housing 12 is eliminated. In one embodiment, lens 426 is similar to lens 150.

Transaction product 410 includes a paper or sheet 430 supporting the one or more auxiliary articles 416, for example, one or more temporary tattoos 438, and is attached to a substantially linear edge 432, for example a top edge, of transaction card 414. More specifically, an outer edge of sheet 430 is coupled with edge 432 such that sheet 430 is configured to hingedly or foldably be manipulated about its boundary with transaction card 414. In one example, sheet 430 defines one or more fold lines 434 extending substantially parallel to one another and to edge 432 of transaction card 414. Sheet 430 includes panels 436 defined between fold line 434 and positioned end-to-end with respect to one another. The one or more articles 416, i.e., one or more temporary tattoos 438, as illustrated in FIG. 16-18 are supported on panels 436. In one embodiment, the one of panels 436 closest to transaction card 414 includes brand indicia 440, etc.

When sheet 430 is folded along fold lines 434, for example, folded forwardly (i.e., into the page as illustrated in FIG. 16), the one of the panels 436 nearest transaction card 414 becomes the front of the folded transaction product 10 (see FIG. 18). In one embodiment, when sheet 430 is folded, one or more of tattoos 438 or other articles 416, are viewable through lens 426, such that when folded, for example, while on retail display, etc., the one or more of tattoos 438 or other articles 416 are viewable by potential consumers and/or potential users. In one embodiment, when sheet 430 is folded, sheet 430 defines at least two dimension smaller than two corresponding outer dimensions of transaction card 414, and when sheet 430 is unfolded, sheet 430 has at least one dimension that is larger than a corresponding outer dimension of transaction card 414. In one example, a sticker, label, etc. (not shown) is used to initially secure sheet 430 in the fully folded position relative to transaction card 414 as will be apparent to those of skill in the art upon reading this application. Other variations of transaction products 10 and 410 are also contemplated Transaction products come in many forms, according to embodiments of the invention. A gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product or at least a portion thereof remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product comprising:
   a substantially planar panel defining an aperture;
   a lens extending across the aperture;
   one or more auxiliary items;
   a foldable sheet supporting each of the one or more auxiliary items, the foldable sheet being folded and positioned relative to the substantially planar panel such that at least one of the one or more auxiliary items is readily viewable through the lens; and
   an account identifier coupled with the substantially planar panel, the account identifier linking the transaction product to an account or record configured to track a financial value available for use toward a purchase price of one or more of goods and services.

2. The transaction product of claim 1, wherein the account identifier is a bar code.

3. The transaction product of claim 1, wherein the account identifier includes at least one of a bar code, a magnetic strip, a smart chip, and a radio frequency identification (RFID) device.

4. The transaction product of claim 1, wherein the lens is a distorting lens.

5. The transaction product of claim 1, wherein the lens is a magnification lens.

6. The transaction product of claim 1, wherein the substantially planar panel defines a front facing surface area and the lens occupies at least about 30% of the front facing surface area.

7. The transaction product of claim 1, wherein the foldable sheet is configured to transition between a first position, in which the foldable sheet is folded to define at least two outer dimensions smaller than at least two corresponding outer dimensions of the substantially planar panel, and a second position, in which the foldable sheet defines at least one outer dimension larger than a corresponding outer dimension of the substantially planar panel.

8. The transaction product of claim 1, wherein the transaction product includes an enclosure defining a storage area, and the enclosure includes the substantially planar panel.

9. The transaction product of claim 8, further comprising a transaction card formed separately from the enclosure and including the account identifier, wherein the transaction card is selectively coupled to the enclosure such that the account identifier is indirectly coupled to the substantially planar panel via the transaction card.

10. The transaction product of claim 9, wherein the transaction card is substantially flat and is slidably and selectively coupled with the enclosure to readily slide between a first position covering an opening to the storage area and a second position leaving at least a portion of the opening to the storage area uncovered.

11. The transaction product of claim 10, wherein:
the substantially planar panel is a first substantially planar panel,
the enclosure includes a second substantially planar panel opposite the first substantially planar panel,
the second substantially planar panel includes an aperture, and
in the first position, the transaction card is maintained on an interior side of the second substantially planar panel such that the account identifier of the transaction card is viewable through the aperture of the second substantially planar panel.

12. The transaction product of claim 8, wherein the foldable sheet and the one or more auxiliary items are maintained within the storage area and are removably coupled with the substantially planar panel of the enclosure via their positioning within the storage area.

13. The transaction product of claim 8, wherein the enclosure includes a box portion including the substantially planar panel, and the transaction product includes an elongated handle extending away from the box portion of the enclosure.

14. The transaction product of claim 1, in combination with a backer supporting the transaction product, wherein the backer defines an opening, and the transaction product is positioned on the backer such that the account identifier is visible through the opening.

15. The transaction product of claim 1, wherein:
the foldable sheet is directly affixed to the substantially planar panel, and
the foldable sheet is configured to repeatedly fold relative to the substantially planar panel between a first position, in which the foldable sheet is folded, positioned directly adjacent a first surface of the substantially planar panel, and has at least two outer dimensions smaller than two corresponding outer dimensions of the substantially planar panel, and a second position, in which the foldable sheet extends away from the substantially planar panel and has at least one outer dimension larger than a corresponding outer dimension of the substantially planar panel.

16. A stored-value assembly comprising:
a housing including:
a first substantially planar member defining a first opening, and
a second substantially planar member defining a second opening,
wherein a chamber is defined between the first substantially planar member and the second substantially planar member;
a lens extending across the first opening; and
a stored-value card formed separately from the housing and including an account identifier linking the stored-value assembly to an account or record configured to track a financial value available for use toward a purchase price of one or more of goods and services, wherein the stored-value card is selectively coupled to the housing such that in a first position, the account identifier of the stored-value card is viewable through the second opening.

17. The stored-value assembly of claim 16, further comprising:
one or more auxiliary items selectively maintained within the chamber.

18. The stored-value assembly of claim 17, further comprising:
a folded sheet supporting each of the one or more auxiliary items, the folded sheet being positioned within the chamber such that at least one of the one or more auxiliary items is readily viewable through the lens.

19. The stored-value assembly of claim 16, wherein the lens is a distorting lens.

20. The stored-value assembly of claim 16, wherein the stored-value card is substantially flat and is slidably and selectively coupled with the housing to readily slide between the first position covering the chamber and a second position leaving at least a portion of the chamber uncovered.

21. The stored-value assembly of claim 20, wherein:
the stored-value card defines a perimeter edge, and
when the stored-value card is positioned in the first position, the perimeter edge of the stored-value card is entirely interposed between different portions of the housing.

22. The stored-value assembly of claim 20, wherein when the stored-value card is slid out of the housing into the second position, a bearer of the stored-value assembly is able to view objects outside of the housing through the lens.

23. The stored-value assembly of claim 16, further comprising a supporting backer formed separately from and coupled to the housing, wherein the supporting backer defines a hole and is positioned with respect to the stored-value card such that the account identifier is viewable through the hole in the supporting backer.

24. The stored-value assembly of claim 16, wherein the housing includes:
- a first casing including the first substantially planar member,
- a second casing including the second substantially planar member,
- a first interior frame defining a recess, wherein the lens is maintained in the recess between the first interior frame and the first casing, and
- a second interior frame defining a void for selectively receiving the stored-value card such that the stored-value card is selectively maintained in the void between the second interior frame and the second casing,
- wherein the first casing is coupled with the second casing to enclose the first interior frame and the second interior frame between the first casing and the second casing.

25. The stored-value assembly of claim 24, wherein the first casing and the second casing are coupled to one another to define a slot therebetween, the slot providing access to the chamber such that the stored-value card can selectively be slid into and out of the chamber via the slot.

26. The stored-value assembly of claim 16, wherein the housing includes a box portion, the box portion includes the first substantially planar member and the second substantially planar member, and the stored-value assembly includes an elongated handle coupled to and extending away from the box portion of the housing.

27. A method of encouraging purchase and facilitate use of a transaction product, the method comprising:
- providing the transaction product including:
  - a housing including a first substantially planar panel, and a second substantially planar panel opposite the first substantially planar panel, the first substantially planar panel defining a first aperture, and the second substantially planar panel defining a second aperture, wherein a chamber is defined between the first substantially planar panel and the second substantially planar panel,
  - a lens extending across the first aperture, and
  - a transaction card formed separately from the housing and including an account identifier linking the transaction product to an account or record configured to track a financial value available for use toward a purchase price of one or more of goods and services, wherein the transaction card is selectively coupled to the housing such that in a first position, the account identifier of the transaction card is viewable through the second aperture;
- supporting the transaction product on a retail display; and
- using a point-of-sale terminal to access and activate the account or record based on a mechanical reading of the account identifier by the point-of-sale terminal so that the financial value of the account or the record is available for application toward the purchase price of the one or more of goods and services.

28. The method of claim 27, wherein the transaction card is substantially flat, and providing the transaction product includes providing the transaction card to be slidably and selectively coupled with the housing to readily slide between the first position covering the chamber and a second position leaving at least a portion of the chamber uncovered.

29. The method of claim 27, wherein providing the transaction card includes providing the housing, which includes a box portion including the first substantially planar panel and the second substantially planar panel, and providing the transaction product to include an elongated handle coupled to and extending away from the box portion of the housing.

30. The transaction product of claim 1, wherein the one or more auxiliary items are directly coupled to the foldable sheet.

31. The transaction product of claim 1, wherein each of the one or more auxiliary items is a tattoo directly secured to the foldable sheet.

32. The transaction product of claim 31, further comprising an enclosure defining a chamber, wherein:
- the substantially planar panel is part of the enclosure such that the chamber is at least partially viewable through the lens, and
- the foldable sheet with the one or more auxiliary items is selectively maintained within the enclosure.

33. The transaction product of claim 32, further comprising a transaction card formed separately from the enclosure and including the account identifier, wherein the transaction card is movably coupled to the enclosure such that the account identifier is indirectly coupled to the substantially planar panel via the transaction card.

* * * * *